United States Patent
Crouch et al.

(10) Patent No.: US 11,988,770 B2
(45) Date of Patent: *May 21, 2024

(54) PHASE-MODULATED CONTINUOUS WAVE RADAR RECEIVER WITH TIME DIVISION QUADRATURE SAMPLING

(71) Applicant: Aurora Operations, Inc., Mountain View, CA (US)

(72) Inventors: Stephen Crouch, Bozeman, MT (US); Chunshu Li, San Jose, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/684,952

(22) Filed: Mar. 2, 2022

(65) Prior Publication Data

US 2022/0381878 A1    Dec. 1, 2022

Related U.S. Application Data

(63) Continuation of application No. 17/332,101, filed on May 27, 2021, now Pat. No. 11,320,516.

(51) Int. Cl.
*G01S 7/35* (2006.01)
*G01S 13/36* (2006.01)
*G01S 13/58* (2006.01)
*G01S 13/931* (2020.01)

(52) U.S. Cl.
CPC .............. *G01S 7/358* (2021.05); *G01S 13/36* (2013.01); *G01S 13/583* (2013.01); *G01S 13/931* (2013.01)

(58) Field of Classification Search
CPC ......... G01S 7/358; G01S 13/36; G01S 13/931
See application file for complete search history.

(56) References Cited

U.S. PATENT DOCUMENTS

| | | | |
|---|---|---|---|
| 10,401,495 B2 | 9/2019 | Crouch | |
| 2009/0015464 A1* | 1/2009 | Fukuda | G01S 7/35 342/194 |
| 2015/0323660 A1* | 11/2015 | Hampikian | G01S 13/347 342/109 |
| 2019/0339388 A1 | 11/2019 | Crouch | |
| 2020/0011968 A1* | 1/2020 | Hammes | G01S 13/931 |
| 2020/0292665 A1* | 9/2020 | Behrens | G01S 7/354 |

(Continued)

FOREIGN PATENT DOCUMENTS

| | | |
|---|---|---|
| EP | 3652497 | 5/2020 |
| WO | 2019014177 | 1/2019 |

OTHER PUBLICATIONS

Bourdoux et al; "PMCW waveform and MIMO technique for a 79 GHz CMOS automotive radar," 2016 IEEE Radar Conference (RadarConf), Philadelphia, PA, 2016, pp. 1-5.

(Continued)

*Primary Examiner* — Donald HB Braswell
(74) *Attorney, Agent, or Firm* — Gray Ice Higdon

(57) ABSTRACT

Time-division quadrature sampling may be used in a pulse-modulated continuous wave (PMCW) radar receiver circuit, e.g., as may be employed in various types of radar sensors used in automotive and other applications, to enable a quadrature sampling circuit to sequence between digitally sampling different complex components of a received radar signal at different times.

18 Claims, 5 Drawing Sheets

(56) References Cited

U.S. PATENT DOCUMENTS

2021/0055383 A1* 2/2021 Lee .................. G01S 13/325
2021/0278536 A1 9/2021 Crouch

OTHER PUBLICATIONS

Giannini et al; "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014.

Guermandi et al., ""A 79GHz 2x2 MIMO PMCW radar SoC in 28nm CMOS," 2016 IEEE AsianSolid-State Circuits Conference (A-SSCC), Toyama, 2016, pp. 105-108, doi:10.1109/ASSCC.2016.7844146."

Och et al; "A Scalable 77 GHz Massive MIMO FMCW Radar by Cascading Fully-Integrated Transceivers," 2018 Asia-Pacific Microwave Conference (APMC), Kyoto, 2018, pp. 1235-1237.

Overdevest et al; "Doppler Influence on Waveform Orthogonality in 79 GHz MIMO Phase-Coded Automotive Radar," in IEEE Transactions on Vehicular Technology, vol. 69, No. 1, pp. 16-25, Jan. 2020.

Pfeffer et al; "FMCW MIMO Radar System for Frequency-Division Multiple TX-Beamforming," in IEEE Transactions on Microwave Theory and Techniques, vol. 61, No. 12, pp. 4262-4274, Dec. 2013.

Texas Instruments; "AWR1843"; https://www.ti.com/tool/MMWCAS-RF-EVM [retrieved from internet wayback machine]; Jan. 10, 2019.

Texas Instruments; "mmWave cascade imaging radar RF evaluation module"; https://www.ti.com/tool/MMWCAS-RF-EVM [retrieved from internet wayback machine]; Oct. 9, 2019.

Texas Instruments; Application Report—AWR2243 Cascade; Oct. 2017.

Wikipedia; MIMO Radar, last updated Dec. 16, 2020.

U.S. Appl. No. 17/332,101, filed May 27, 2021 titled "Phase-Modulated Continuous Wave Radar Receiver With Time Division Quadrature Sampling".

USPTO, Office Action for U.S. Appl. No. 17/332,101 dated Aug. 30, 2021.

U.S. Patent and Trademark Office, Notice of Allowance for U.S. Appl. No. 17/332,101 dated Dec. 24, 2021.

European Patent Office, International Search Report and Written Opinion for PCT/US2022/024774 dated Aug. 9, 2022, 7 pages.

* cited by examiner

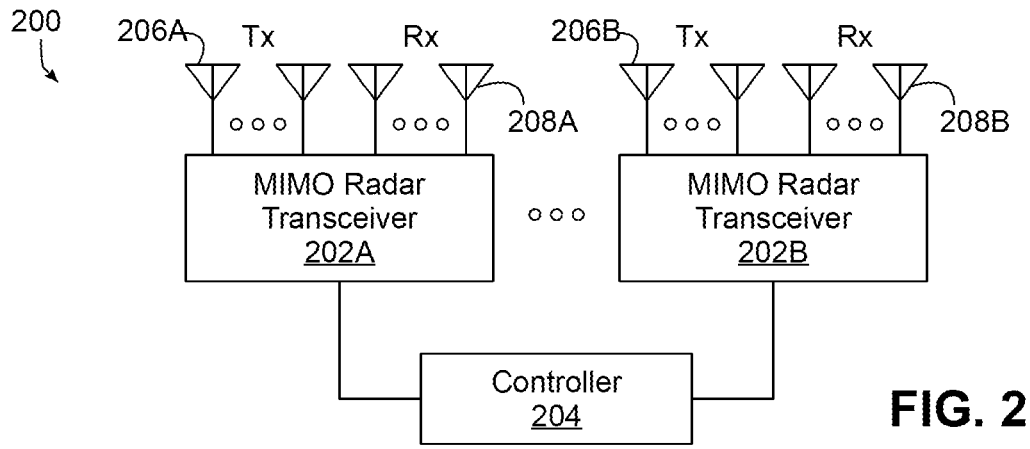
FIG. 2
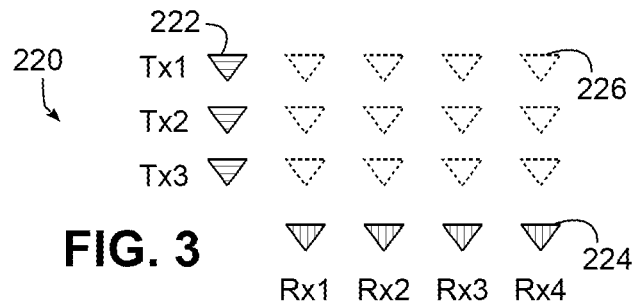
FIG. 3
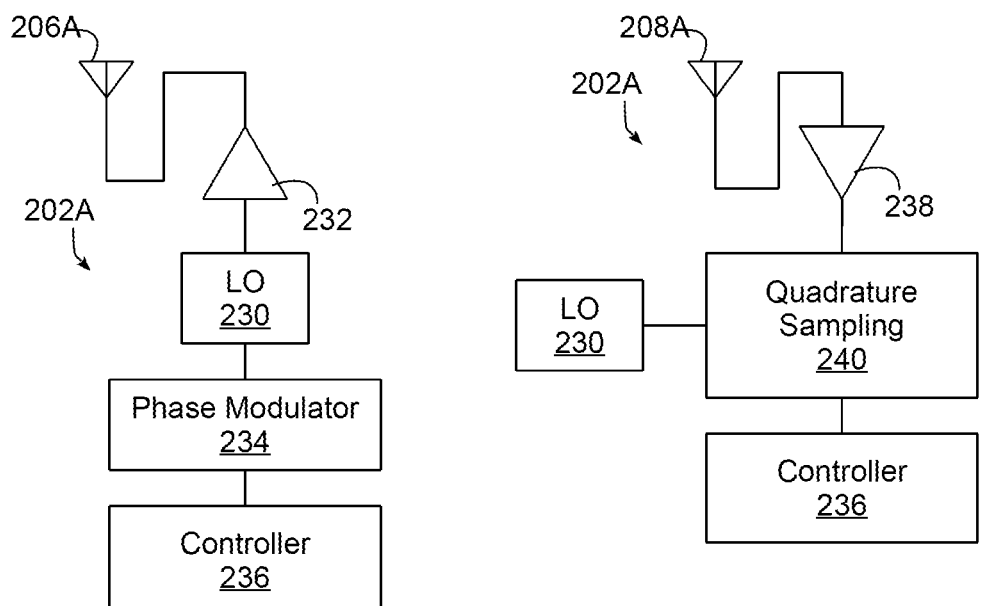
FIG. 4
FIG. 5

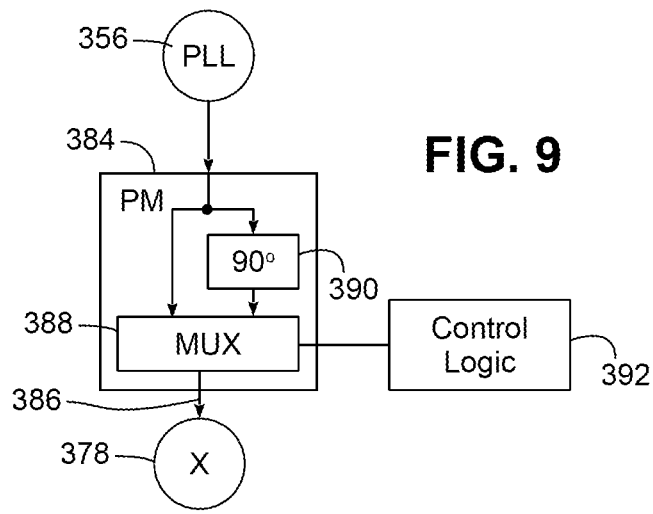
FIG. 9
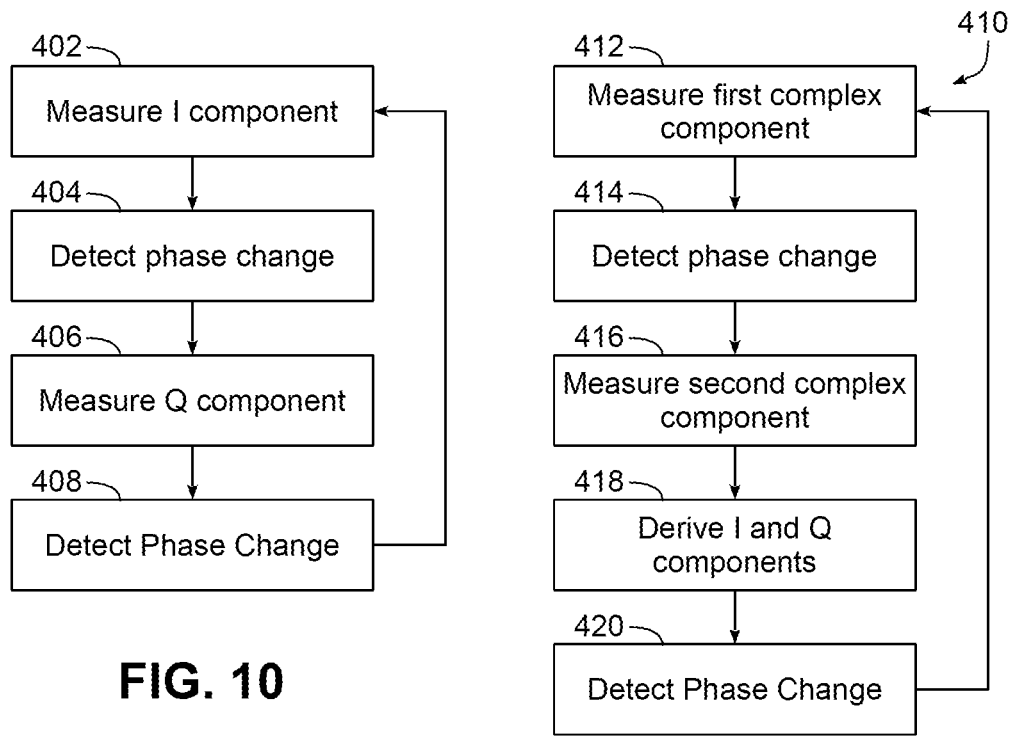
FIG. 10
FIG. 11

PHASE-MODULATED CONTINUOUS WAVE RADAR RECEIVER WITH TIME DIVISION QUADRATURE SAMPLING

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular technology that is increasingly relied upon for collecting information about a vehicle's surrounding environment is radar, which is based on the emission, reflection and sensing of radio wave electromagnetic radiation within an environment to detect, and in some instances, determine the position and velocity of various objects within the environment. Despite continuing improvements to radar performance, however, both cost and technical limitations continue to exist, so a continuing need exists for improvements to radar technology, and particularly for radar technology used in connection with the control of an autonomous vehicle.

SUMMARY

The present disclosure is generally related to the use of time-division quadrature sampling in a pulse-modulated continuous wave (PMCW) radar receiver circuit, e.g., as may be employed in various types of radar sensors used in automotive and other applications. Time-division quadrature sampling may be used, for example, to enable a quadrature sampling circuit to sequence between digitally sampling different complex components of a received radar signal at different times, and in some instances, reducing the complexity, power consumption and/or signal loss of a radar receiver circuit.

Therefore, consistent with one aspect of the invention, a radar circuit disposed on at least one integrated circuit (IC) may include a phase modulator circuit configured to selectively shift a phase of a local oscillator (LO) signal to generate a selectively shifted LO signal, a phase-modulated continuous wave (PMCW) radar receiver circuit configured to receive an input PMCW radar signal, the PMCW radar receiver circuit including a mixer configured to mix the selectively shifted LO signal generated by the phase modulator circuit with the input PMCW radar signal and an analog to digital converter (ADC) in communication with the mixer, the ADC configured to generate a digital signal representative of an analog output of the mixer, and control logic configured to control the phase modulator circuit to alternate between first and second states to vary a phase shift of the selectively shifted LO signal. When the control logic controls the phase modulator circuit to operate in the first state, the digital signal output by the ADC is representative of an in-phase (I) component of the input PMCW radar signal and when the control logic controls the phase modulator circuit to operate in the second state, the digital signal output by the ADC is representative of a quadrature (Q) component of the input PMCW radar signal.

In addition, some embodiments may also include a PMCW radar transmitter circuit configured to generate an output PMCW radar signal using the phase modulator circuit. Also, in some embodiments, the phase modulator circuit is a receiver phase modulator circuit, and the radar circuit further includes a PMCW radar transmitter circuit configured to generate an output PMCW radar signal and including a transmitter phase modulator circuit separate from the receiver phase modulator circuit and used to generate the output PMCW radar signal.

Moreover, in some embodiments, the PMCW radar receiver circuit is a first PMCW radar receiver circuit for a first receive channel, and the radar circuit further includes a plurality of additional PMCW radar receiver circuits for a plurality of additional receive channels, each additional PMCW radar receiver circuit of the plurality of PMCW radar receiver circuits including a respective mixer configured to mix the selectively shifted LO signal generated by the phase modulator circuit with an additional input PMCW radar signal and a respective analog to digital converter (ADC) in communication with the respective mixer, the respective ADC configured to generate a respective digital signal representative of an analog output of the respective mixer.

Consistent with another aspect of the invention, a radar system for a vehicle may include a phase-modulated continuous wave (PMCW) radar receiver circuit configured to receive a PMCW radar signal, and a quadrature sampling circuit coupled to the PMCW radar receiver circuit and configured to determine in-phase (I) and quadrature (Q) components of the input PMCW radar signal using time-division quadrature sampling.

Further, in some embodiments, the quadrature sampling circuit is configured to determine the I and Q components of the input PMCW radar signal using time-division quadrature sampling by alternating between sampling the I and Q components of the input PMCW radar signal over time. Also, in some embodiments, the quadrature sampling circuit includes a mixer configured to mix the input PMCW radar signal with a local oscillator (LO) signal and an analog to digital converter (ADC) configured to generate the I and Q components of the input PMCW radar signal by digitally sampling an analog output signal of the mixer, and the radar system further includes control logic configured to controllably vary a phase of the LO signal during at least one of first and second durations such that during the first duration the ADC outputs the I component of the input PMCW radar signal and during the second duration the ADC outputs the Q component of the input PMCW radar signal. Further, in some embodiments, the control logic is configured to controllably vary the phase of the LO signal during at least one of the first and second durations by varying the phase of the LO signal during the second duration to be about 90 degrees offset from the phase of the LOC signal during the first duration.

Some embodiments may further include a phase modulator circuit configured to selectively shift a phase of the LO signal, and the control logic may be configured to control the phase modulator circuit to alternate between first and second states, where the control logic controls the phase modulator circuit during the first duration to control the phase of the LO signal such that the ADC outputs the I component of the input PMCW radar signal and controls the phase shift circuit during the second duration to control the phase of the LO signal such that the ADC outputs the Q component of the input PMCW radar signal.

Some embodiments may also include a PMCW radar transmitter circuit configured to generate an output PMCW radar signal using the phase modulator circuit. In some embodiments, the PMCW radar transmitter circuit is configured to generate the output PMCW radar signal by applying pseudorandom phase shifts to a continuous radio frequency (RF) carrier using the phase modulator circuit. Also, in some embodiments, the phase modulator circuit is a receiver phase modulator circuit, and the radar system further includes a PMCW radar transmitter circuit configured to generate an output PMCW radar signal and including a transmitter phase modulator circuit separate from the receiver phase modulator circuit and used to generate the output PMCW radar signal.

In some embodiments, the quadrature sampling circuit includes a mixer configured to mix the input PMCW radar signal with a local oscillator (LO) signal and an analog to digital converter (ADC) configured to generate first and second complex components of the input PMCW radar signal by digitally sampling an analog output signal of the mixer, the radar system further includes control logic configured to controllably vary a phase of the LO signal during at least one of first and second durations such that during the first duration the ADC outputs the first component of the input PMCW radar signal and during the second duration the ADC outputs the second component of the input PMCW radar signal, and the quadrature sampling circuit is configured to determine the I and Q components of the input PMCW radar signal using time-division quadrature sampling by alternating between sampling the first and second complex components of the input PMCW radar signal over time and determining the I and Q components from the first and second complex components.

Further, in some embodiments, the first complex component is the I component and the second complex component is the Q component. In some embodiments, at least one of the first and second complex components is a mixture of the I and Q components.

Consistent with another aspect of the invention, a method may include receiving an input PMCW radar signal with a radar circuit disposed on at least one integrated circuit (IC), and determining in-phase (I) and quadrature (Q) components of the input PMCW radar signal using time-division quadrature sampling.

Further, in some embodiments, determining the I and Q components of the input PMCW radar signal using time-division quadrature sampling includes alternating between sampling the I and Q components of the input PMCW radar signal over time. Also, in some embodiments, determining the I and Q components of the input PMCW radar signal using time-division quadrature sampling includes mixing the input PMCW radar signal with a local oscillator (LO) signal using a mixer, digitally sampling an analog output signal of the mixer using an analog to digital converter (ADC) to generate the I and Q components of the input PMCW radar signal, and controllably varying a phase of the LO signal during at least one of first and second durations such that during the first duration the ADC outputs the I component of the input PMCW radar signal and during the second duration the ADC outputs the Q component of the input PMCW radar signal.

In addition, in some embodiments, controllably varying the phase of the LO signal is performed using a phase modulator circuit configured to selectively shift a phase of the LO signal, and the method further includes generating an output PMCW radar signal with a PMCW radar transmitter using the phase modulator circuit. In some embodiments, determining the I and Q components of the input PMCW radar signal using time-division quadrature sampling includes mixing the input PMCW radar signal with a local oscillator (LO) signal using a mixer, digitally sampling an analog output signal of the mixer using an analog to digital converter (ADC) to generate first and second complex components of the input PMCW radar signal, controllably varying a phase of the LO signal during at least one of first and second durations such that during the first duration the ADC outputs the first component of the input PMCW radar signal and during the second duration the ADC outputs the second component of the input PMCW radar signal, and determining the I and Q components of the input PMCW radar signal by alternating between sampling the first and second complex components of the input PMCW radar signal over time and determining the I and Q components from the first and second complex components.

In addition, in some embodiments, the radar circuit includes a plurality of receive channels configured to receive a plurality of input PMCW radar signals, the input PMCW radar signal is a first PMCW radar signal of the plurality of input PMCW radar signals, and the method further includes determining I and Q components of each of the plurality of input PMCW radar signals using time-division quadrature sampling. Also, in some embodiments, each receive channel includes a respective quadrature sampling circuit including a respective mixer and a respective ADC, and determining the I and Q components of each of the plurality of input PMCW radar signals using time-division quadrature sampling includes using the respective mixer and respective ADC of each respective quadrature sample circuit to determine both of the I and Q components for the input PMCW radar signal for the respective receive channel.

Consistent with another aspect of the invention, a radar circuit disposed on at least one integrated circuit (IC) may include a phase-modulated continuous wave (PMCW) radar transmitter circuit configured to generate an output PMCW radar signal, the PMCW transmitter circuit including a phase modulator circuit configured to generate a phase modulated local oscillator (LO) signal used to generate the first PMCW radar signal, and a PMCW radar receiver circuit configured to receive an input PMCW radar signal received in response to transmission of the output PMCW radar signal, the PMCW radar receiver circuit including a quadrature sampling circuit, and the quadrature sampling circuit including a mixer having a first input coupled to receive the input PMCW radar signal and a second input coupled to receive the phase modulated LO signal generated by the phase modulator circuit of the PMCW radar transmitter circuit.

In addition, in some embodiments, the PMCW radar receiver circuit is a first PMCW radar receiver circuit for a first receive channel, and the radar circuit further includes a plurality of additional PMCW radar receiver circuits for a plurality of additional receive channels, each additional PMCW radar receiver circuit of the plurality of PMCW radar receiver circuits including a respective quadrature sampling circuit, and each quadrature sampling circuit including a respective mixer having a first input coupled to receive an additional input PMCW radar signal and a second input coupled to receive the phase modulated LO signal generated by the phase modulator circuit of the PMCW radar transmitter circuit. In some embodiments, the phase modulator circuit of the PMCW radar transmitter circuit is configured to selectively shift a phase of the phase modulated LO signal to generate a selectively shifted LO signal that alternates between first and second phase shifts such that the quadrature sampling circuit samples an in-phase (I) component of the input PMCW radar signal when the first phase shift is applied to the phase modulated LO signal and samples a quadrature (Q) component of the input PMCW radar signal when the second phase shift is applied to the phase modulated LO signal.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example implementation of a Multiple Input Multiple Output (MIMO) radar sensor that may be utilized by implementations disclosed herein.

FIG. 3 illustrates an example virtual antenna array capable of being produced by a MIMO radar sensor that may be utilized by implementations disclosed herein.

FIG. 4 illustrates an example transmitter channel for the MIMO radar sensor of FIG. 2.

FIG. 5 illustrates an example receiver channel for the MIMO radar sensor of FIG. 2.

FIG. 9 illustrates an example implementation of the phase modulator circuit referenced in FIG. 8.

FIG. 10 illustrates an example implementation of a quadrature sampling process using the MIMO radar sensor of FIG. 7 or FIG. 8.

FIG. 11 illustrates an alternate example implementation of a quadrature sampling process to that of FIG. 10.

DETAILED DESCRIPTION

The herein-described implementations are generally directed to various improvements associated with pulse-modulation continuous wave (PMCW) radar sensors, and in particular to PMCW radar sensors employing multiple input multiple output (MIMO) functionality, e.g., for use in connection with the control of an autonomous or other type of vehicle, among other applications. While the herein-described techniques may be utilized in connection with other types of radar sensors, and in particular, in connection with non-MIMO radar sensors, a brief discussion of an autonomous vehicle environment and of MIMO radar sensors is provided below.

Autonomous Vehicle Environment

Figure 1:
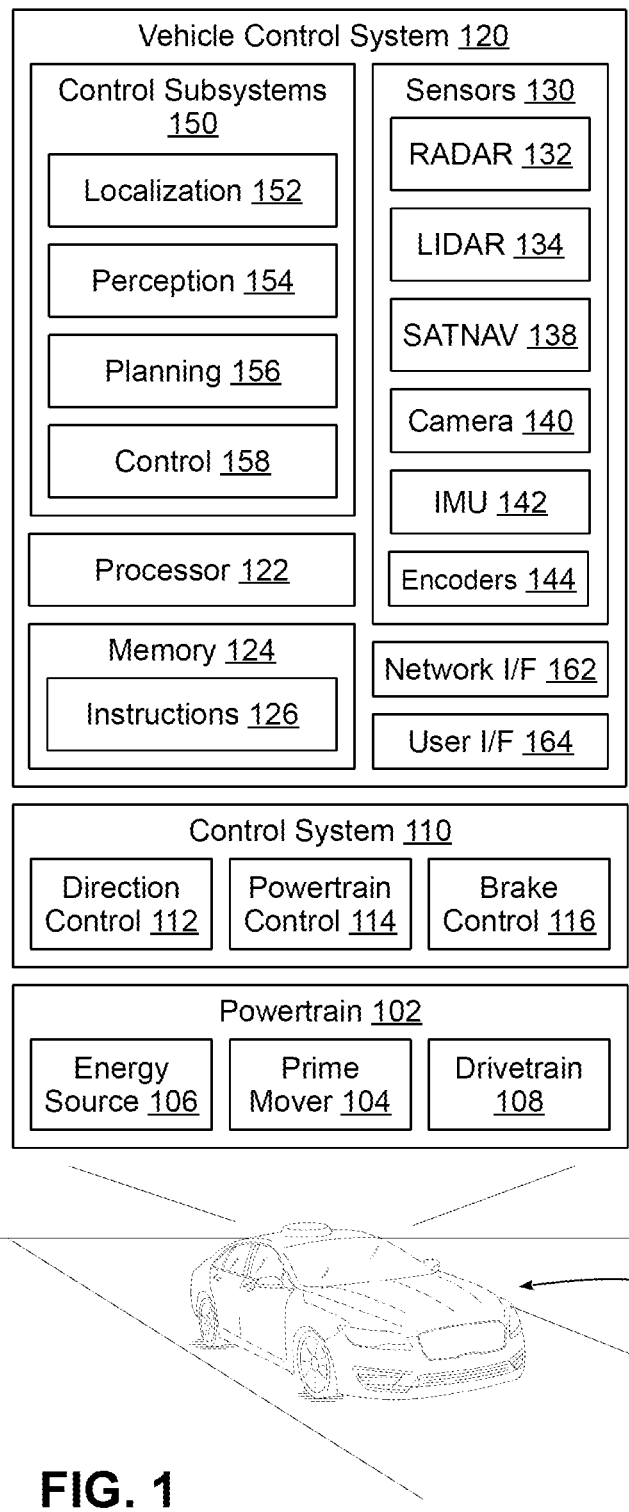
FIG. 1 illustrates an example environment in which implementations disclosed herein can be implemented.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, sensors 130 may include one or more Radio Detection and Ranging (RADAR) sensors, with which a number of the techniques described herein may be implemented.

Sensors 130 may also optionally include one or more Light Detection and Ranging (LIDAR) sensors 132, as well as one or more satellite navigation (SATNAV) sensors 138, e.g., compatible with any of various satellite navigation systems such as GPS, GLONASS, Galileo, Compass, etc. Each SATNAV sensor 138 may be used to determine the location of the vehicle on the Earth using satellite signals. Sensors 130 may also optionally include one or more cameras 140, one or more inertial measurement units (IMUS) 142, one or more wheel encoders 144, or a combination thereof. Each camera 140 may be a monographic or stereographic camera and may record one or more of still and video imagers. Each IMU 142 may include multiple gyroscopes and accelerometers capable of detecting linear and rotational motion of the vehicle 100 in three directions. Wheel encoders 144 may be used to monitor the rotation of one or more wheels of vehicle 100.

The outputs of sensors 130 may be provided to a set of control subsystems 150, including, for example, a localization subsystem 152, a perception subsystem 154, a planning subsystem 156, and a control subsystem 158. As will become more apparent hereinafter, radar sensors 132 may be used by one or more of such subsystems 152-158 to control an autonomous vehicle.

Localization subsystem 152 may be principally responsible for precisely determining the location and orientation (also sometimes referred to as "pose") of vehicle 100 within its surrounding environment, and generally within some frame of reference.

Perception subsystem 154 may be principally responsible for detecting, tracking and identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, and as described herein, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

MIMO Radar Sensors

FIG. 2 next illustrates an example radar sensor 200 within which the various techniques described herein may be implemented. In some implementations, radar sensor 200 can be a distributed radar sensor. In some implementations, sensor 200 includes one or more MIMO radar transceivers (e.g., transceivers 202A and 202B) coupled to a controller 204, with each MIMO radar transceiver generally including multiple transmit (Tx) antennas (e.g., transmit antennas 206A, 206B) and multiple receive (Rx) antennas (e.g., receive antennas 208A, 208B) to implement a phased antenna array.

Each transceiver 202A, 202B may be disposed on a separate integrated circuit (IC) or chip in some implementations, while in other implementations multiple transceivers may be disposed on the same chip. Further, multiple transceivers 202A, 202B may be disposed on separate or common modules, boards, cards, or housings in various implementations. In addition, it will be appreciated that, rather than utilizing transceivers that handle both transmission and reception of radar signals, some implementations may utilize separate circuitry for these functions, and transmitter and/or receiver circuits may be disposed on multiple chips and/or individual chips may include zero or more transmitter circuits and zero or more receiver circuits.

Controller 204 is generally coupled to one or more transceivers. For example, controller 204 is coupled to each transceiver 202A, 202B for controlling both (i) the generation of radar signals for transmission or emission by transmit antennas 206A, 206B and (ii) the reception and processing of radar signals received by receive antennas 208A, 208B. It will be appreciated that the functionality implemented by controller 204 may be allocated in various manners in different implementations, e.g., using one or more chips that are separate from each transceiver 202A, 202B and disposed on the same or different module, board, card or housing, or being wholly or partially integrated into the same chips as one or more of the transceivers. The functionality of controller 204 may also be at least partially implemented external of any radar sensor in some implementations, e.g., integrated into other processors or controllers in the vehicle control system of an autonomous vehicle. Further, while a single controller 204 is illustrated in FIG. 2, the invention is not so limited, as multiple controllers may be used to implement different functionality in a radar sensor in some implementations, e.g., using multiple controllers integrated with each transceiver 202A, 202B. In some implementations, one or more of controller 204 and transceivers 202A, 202B may be implemented using one or more Monolithic Microwave Integrated Circuits (MMICs).

As such, it will be appreciated that the functionality described herein may in some implementations be implemented using various types of control logic and/or circuits, whether integrated into a transmitter, receiver or transceiver, processor, controller, computer system, etc., whether disposed on one or more integrated circuits (ICs) or chips, and whether incorporating hardwired logic or programmable logic capable of executing program code instructions. Control logic may also be considered to include analog circuitry, digital circuitry, or both in various implementations. As such, the invention is not limited to the particular control logic or circuit implementation details described herein.

Likewise, transmit antennas 206A, 206B and receive antennas 208A, 208B may be implemented in a wide variety of manners, e.g., as patch antennas disposed on one or more printed circuit boards or cards, or in some instances disposed on or in a package or chip and thus integrated with a transceiver or controller of the radar sensor, e.g., using antenna on packaging (AOP) or antenna on chip (AOC) technology. Antennas 206A, 206B, 208A, 208B may be omnidirectional or directional in different implementations. In some implementations, the same antennas may be used for both transmit and receive; however, in the illustrated implementations, separate antennas are used to handle the transmission and reception of radar signals. Therefore, a reference to an antenna as being a transmit antenna or a receive antenna herein does not necessarily require that the antenna be used exclusively for that purpose.

Antennas 206A, 206B, 208A, 208B in the illustrated implementations are desirably physical arranged and electronically controlled to implement a MIMO virtual antenna array (VAA), i.e., an array of virtual array elements that individually represent unique transmit/receive antenna pairs. FIG. 3, for example, illustrates an example virtual antenna array 220 formed from a set of three physical transmit antennas 222 (Tx1, Tx2, Tx3, each of which corresponding, for example, to a transmit antenna 206A, 206B in FIG. 2) and four physical receive antennas 224 (Rx1, Rx2, Rx3, Rx4, each of which corresponding, for example, to a receive antenna 208A, 208B in FIG. 2), which together form a virtual antenna array having a 3×4 or 12 element array of virtual array elements 226, thereby increasing the effective number of antennas and improving cross-range resolution. It will be appreciated that different numbers or arrangements of physical transmit and receive antennas may be used to form different sizes and arrangements of virtual antenna arrays, so the invention is not limited to the specific array illustrated in FIG. 3.

Increasing the numbers of physical transmit antennas and physical receive antennas for a virtual antenna array, and thus the number of virtual array elements in the virtual antenna array, may generally be used to increase angular resolution, detection range or signal to noise ratio. In one example implementation, an individual transceiver chip having three transmit antennas and four receive antennas may be used to form a virtual antenna array having twelve virtual array elements, which may, in some instances, be used to form a one dimensional array of <5 cm length (e.g., emphasizing azimuth resolution) or in other instances form a two dimensional of at most about 1 cm×1 cm (e.g., providing coarse resolution in both azimuth and elevation). If four of such transceiver chips are used in the same virtual antenna array, however, a total of 12 transmit antennas and 16 receive antennas may be used to generate 192 virtual array elements. Such element counts may be used for example, to generate two dimensional array layouts over about a 10 cm×10 cm area, and allowing for an angular resolution of a few degrees in both azimuth and elevation.

Now turning to FIGS. 4 and 5, these figures respectively illustrate example transmit and receive channels or paths for individual transmit and receive antennas 206A, 206B, 208A, 208B in transceiver 202A (it being understood that similar components may be used for other transceivers such as transceiver 202B). While the techniques described herein may be applicable to other types of radar sensors, the illustrated implementations will focus on MIMO radar sensors that utilize millimeter wave phase-modulated continuous wave (PMCW) radar signals.

In the transmit channel of transceiver 202A as illustrated in FIG. 4, a local oscillator (LO) 230 generates a PMCW radio frequency (RF) signal, e.g., at a frequency within the range of 76 GHz to 81 GHz, or at a frequency in a higher or lower frequency band. The PMCW RF signal is amplified by an amplifier 232 to drive a transmit antenna 206A. The phase of LO 230 is determined by a phase modulator block 234, which is capable of selectively shifting the phase of LO 230 to effectively generate a sequence of phase shifts that may be used to both correlate a received PMCW RF signal at one of receive channels with the PMCW RF signal transmitted by the transmit channel, but also to determine a delay between the transmitted and received signals that is indicative of the range or distance between the radar sensor and a target. Control over phase modulator block 234 may be provided by a controller 236, which in some instances may be controller 204, while in other instances may be other control logic, e.g., as may be integrated into transceiver 202A. Controller 236 may be used in some instances to generate a pseudo-random binary sequence that is used to toggle the phase modulator between two states (e.g., 0 and 90 degree phase shifts).

In the receive channel of transceiver 202A as illustrated in FIG. 5, a received RF signal from an antenna 208A is amplified by an amplifier 238 and then provided to a quadrature sampling circuit 242 that uses a local oscillator (LO) signal to sample different complex components of the received RF signal, e.g., to generate digital samples that are indicative of in-phase (I) and quadrature (Q) components of a complex RF signal, which are then provided to controller 236 for further processing. In some instances, sampling of complex components may occur in parallel, e.g., using multiple mixers and multiple analog-to-digital converters (ADC); however, as will be discussed in greater detail below, in some instances a technique referred to herein as time-division quadrature sampling may be used to sample the complex components serially to reduce the complexity of the quadrature sampling circuit.

It will be appreciated that in different implementations, various components among components 230-240 of FIGS. 4 and 5 may be shared by multiple transmit channels or multiple receive channels and that multiple instances of some components may be dedicated to different channels. Further, other architectures may be used to implement transmit channels or receive channels in other implementations, so the invention is not limited to the specific architecture illustrated in FIGS. 4-5. In addition, in some implementations, controller 236 may be replaced by controller 204 of radar sensor 200. In these implementations, controller 204 of radar sensor 200 may control one or more components of components 230-240 described with reference to FIGS. 4 and 5.

Figure 6:
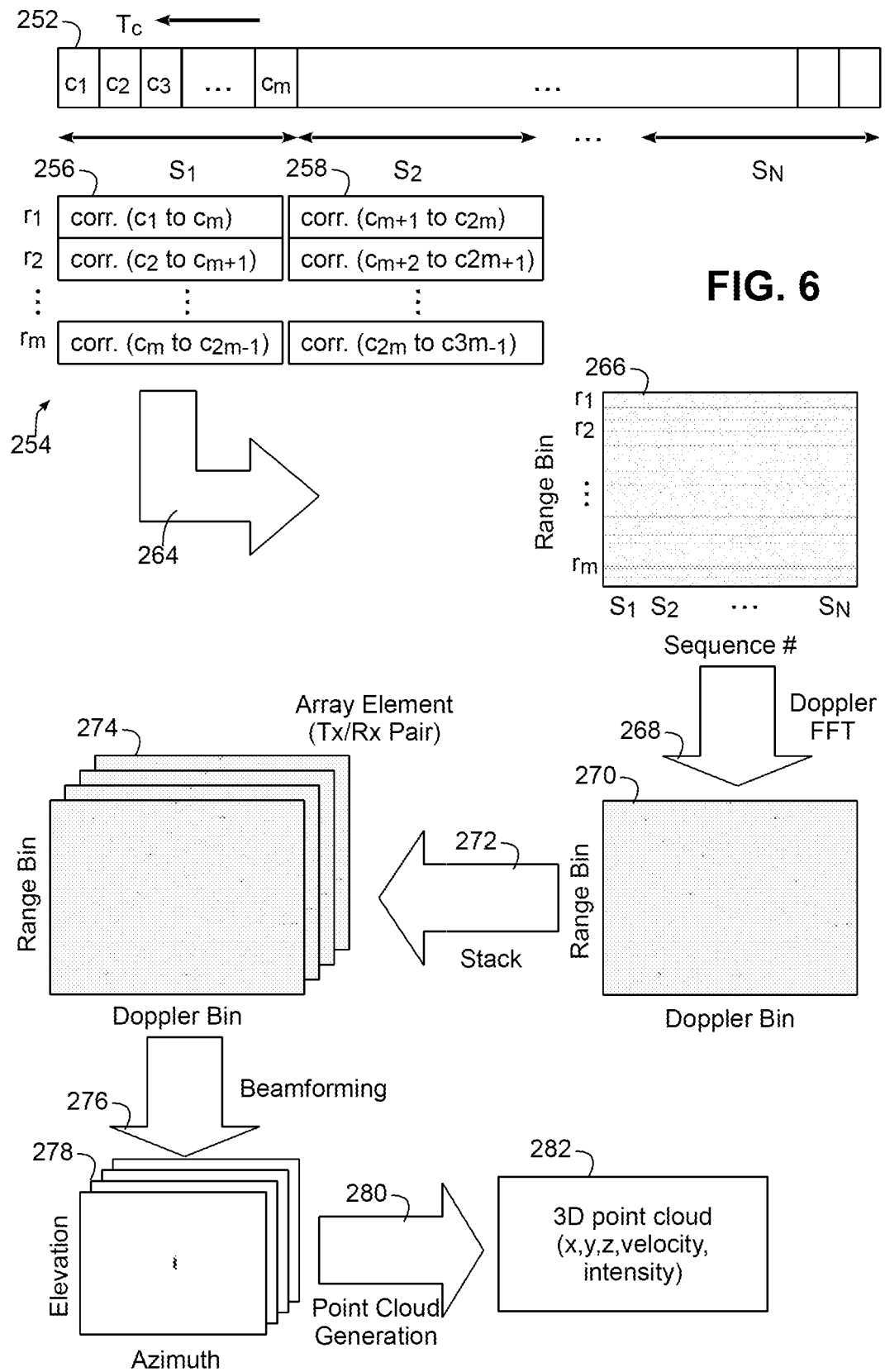
FIG. 6 illustrates an example process for sensing targets in an environment with various implementations disclosed herein.

FIG. 6 next illustrates diagrams showing general operations of a radar sensor and data generated by the radar sensor. For example, the radar sensor may be a PMCW MIMO radar sensor such as radar sensor 200 discussed above in connection with FIGS. 2-5. From the perspective of a single transmit channel/receive channel pair, pseudo-random codes 252 are output from the transmit channel as a plurality of sequences $S_{1-N}$, with each sequence consisting of m codes, and a correlator 254 in the receive channel is used to attempt to range correlate the signal received by the receive channel with each of the sequences of codes. It will be appreciated that a received signal, which has been received after reflection off of a target, will have a delay that varies with the distance or range of that target, and thus, by range correlating the codes detected in the received signal with the transmitted codes, the range of the target may be determined.

Thus, for sequence $S_1$, a set of correlation blocks 256 perform a set of 1 . . . m correlations with sequences of m codes, corresponding to different range bins $r_1$ to $r_m$. For range bin $r_1$, a correlation is performed with codes $c_1$ to $c_m$, for range bin $r_2$, a correlation is performed with codes $c_2$ to $c_{m+1}$, etc. Similarly, for sequence $S_2$, a set of correlation blocks 258 perform a set of 1 . . . m correlations with sequences of m codes, also corresponding to different range bins $r_1$ to $r_m$. For range bin $r_1$, a correlation is performed with codes $c_{m+1}$ to $c_{2m}$, for range bin $r_2$, a correlation is performed with codes $c_{m+2}$ to $c_{2m+1}$, etc.

A strong correlation in a particular range bin generally indicates a potential target in the field of view of a radar sensor, thus enabling the range from the radar sensor to the target to be determined. Moreover, through further processing of the correlation data, Doppler velocity (i.e., radial velocity of the target relative to the radar sensor) and/or angle of arrival, in terms of one or both of azimuth and elevation, may also be determined.

Thus, as illustrated at 264, the correlation results may be collected over the N sequences to form a two-dimensional array 266 with one axis or dimension representing the correlation results over one sequence (vertical axis in FIG. 6) and the other axis representing the various sequences (horizontal axis in FIG. 6). It may also be seen by the representation of array 266 that horizontal lines generally represent range bins where potential targets at various ranges corresponding to those range bins have been detected over the course of multiple sequences.

Next, velocity measurements (e.g., Doppler measurements) are determined, generally by performing an FFT operation 268 (referred to herein as a Doppler FFT) to recover phase information corresponding to Doppler shifts. Transforming across the set of sequences results in a data set that may be represented by an array 270 arranged by ranging bin (vertical axis) and Doppler bin (horizontal axis), where each Doppler bin generally corresponds to a particular velocity for a potential target disposed within a particular range bin.

Next, beamforming is performed to determine angle of arrival information. It should be noted that arrays 266 and 270 are each based on the samples for a single transmit channel/receive channel (Tx/Rx) pair. Thus, a stacking operation 272 may be performed to stack the arrays 270 generated by the Doppler FFT operation for different Tx/Rx pairs (also referred to as array elements) into a data stack 274.

It will be appreciated that each different Tx/Rx pair may have a different spatial relationship between the respective physical transmit and receive antennas for the pair, which can lead to slightly different phases reported for the same target for different Tx/Rx pairs. In the case of a uniform linear array, a third FFT operation 276 (referred to herein as a beamforming FFT) may therefore use the set of values across the different array elements in stack 274 (also referred as a beamvector) to estimate an angle of arrival at each range-Doppler location (i.e., each combination of range bin and Doppler bin). More generally, a set of complex responses expected for some set of azimuth and elevation angles of arrival, also known as steering vectors, may be multiplied onto the beamvectors to generate azimuth and elevation angles for each target (represented by graphs 278).

Then, the aforementioned range, Doppler and angle of arrival information may be combined in some implementations by a point cloud generation operation 280 into a three dimensional point cloud 282 including estimated position (e.g., using cartesian or polar coordinates), velocity, and signal intensity (or confidence) for a plurality of targets in the field of view of the radar sensor.

It will be appreciated that a wide variety of modifications and enhancements may be made to the aforementioned operations of FIG. 6, so the invention is not limited to this specific sequence of operations. For example, rather than using pseudo-random codes, other types of codes such as maximum length sequence (MLS) codes or almost perfect auto-correlation sequence (APAS codes) (among others) may be used, and as a result, other types of range correlation structures or operations may be used. Further, even using pseudo-random codes, other types of range correlation structures or operations may be used. In the implementation of FIG. 6, for example, the correlation structure is performed in the time domain with multiple parallel correlation paths, with each correlation path generating one range bin. In another example implementation, a frequency domain correlation may be performed, e.g., by performing FFT and IFFT such as "corr(a, b)=ifft(fft(a)*conv(fft(b)))", which can avoid the use of multiple correlation paths, replacing them with FFT and IFFT operations of the codes and received signals.

Those skilled in the art, having the benefit of the present disclosure, will recognize that the exemplary environment illustrated in FIGS. 1-6 is not intended to limit implementations disclosed herein. Indeed, those skilled in the art will recognize that other alternative hardware or software environments may be used without departing from the scope of implementations disclosed herein. It will also be appreciated that the various radar techniques described herein may be utilized in connection with other applications, so the invention is not limited to MIMO radars or radar sensing systems used solely in connection with the control of an autonomous vehicle.

Time-Division Quadrature Sampling in PMCW Radar

Phase-modulated continuous wave (PMCW) radar, in contrast with frequency-modulated continuous wave (FMCW) radar, generally uses pseudo-random (PN) binary symbols that are mapped onto the phase shifts of a continuous radio frequency (RF) carrier. PMCW radar has been found to have several attractive properties compared to FMCW. First, PMCW radar can have a very sharp, thumbtack-like range sidelobe function that leverages a good autocorrelation property in the PN sequence as compared to the sidelobe function in FMCW radar, which relies on Fast Fourier Transform (FFT) spectrum analysis. Second, PMCW radar generally has a simplified analog frontend compared to FMCW radar, and is able to perform much of the signal processing with digital circuits, which can take advantage of faster digital circuits as a result of technology scaling. Third, PMCW radar provides generally good robustness against interference.

One disadvantage of conventional PMCW radar, particularly when used in automotive applications, is the requirement that the quadrature sampling circuit in each receiver (Rx) channel generally requires two analog to digital converters (ADC) to run at a gigasample-per-second (Gsps) sampling rate, primarily due to the fact that a PMCW waveform's baseband bandwidth is normally relatively high (e.g., about 1-4 GHz) in order to obtain sufficient range resolution. In contrast, an FMCW radar's baseband bandwidth is normally <100 MHz due to stretch processing (e.g., dechirping) in the Rx channel mixer to reduce ADC sampling requirements. Each Rx channel in a PMCW radar system generally utilizes quadrature mixing in order to resolve the Doppler sign, in particular to determine whether a target is moving towards or away from the radar sensor, so separate ADCs are generally used for in-phase (I) and quadrature (Q) sampling.

Having two separate ADCs running at about 1-4 GHz, however, can be extremely power hungry and can increase die cost. Moreover, in MIMO and other multi-channel applications, these effects are compounded as the number of Rx channels increases, and in some instances, can limit the number of Rx channels that can be integrated into a single chip, and can thereby limit achievable angular resolution.

In the implementations discussed herein, however, a time-division quadrature sampling architecture may be employed to enable a quadrature sampling circuit to sequence between digitally sampling different complex components of a received radar signal at different times, and in some instances, reducing the complexity, power consumption and/or signal loss of a radar receiver circuit. In particular, in some implementations, a single ADC may be used to alternate between sampling different complex components of a received radar signal (e.g., I and Q components) over time, e.g., based upon one or more intermediate frequency (IF) signals generated using one or more mixers that mix an incoming or received PMCW radar signal with one or more local oscillator (LO) signals having different relative phases.

In one example implementation described hereinafter, for example, a PMCW radar receiver circuit may include a quadrature sampling circuit that includes a mixer that mixes a received PMCW radar signal with a selectively shifted LO signal generated by a phase modulator circuit to generate a downconverted analog IF signal and an ADC that receives the downconverted analog IF signal output by the mixer and digitally samples the downconverted analog IF signal to generate a digital signal representative of the downconverted analog IF signal. The phase modulator circuit, which as will become more apparent below, may be disposed in a the radar receiver circuit, in a radar transmitter circuit, or separate from either a radar receiver circuit or a radar transmitter circuit, may alternate between applying first and second phase shifts to an LO signal to provide an LO signal to the mixer with respective first and second phases. In some implementations, for example, 0 degree and 90 degree phase shifts may be alternately applied by the phase modulator circuit, such that when the 0 degree phase shift is applied, the output of the mixer represents the I component of the received PMCW radar signal and when the 90 degree phase shift is applied, the output of the mixer represents the Q component of the received PMCW radar signal. By sequentially sampling the I and Q components, a single mixer and a single ADC may be used in one Rx channel, and moreover, as a result of simplifying the Rx architecture, a lower noise figure of the Rx system may be achieved compared to the traditional quadrature mixing due to the significantly reduced number of RF components involved.

Further, in some implementations, and as will become more apparent below, a time-division quadrature sampling architecture may be further simplified and optimized by utilizing the phase modulator circuit of a Tx channel to provide a selectively shifted LO signal for use by an RX channel quadrature sampling circuit.

Figure 7:
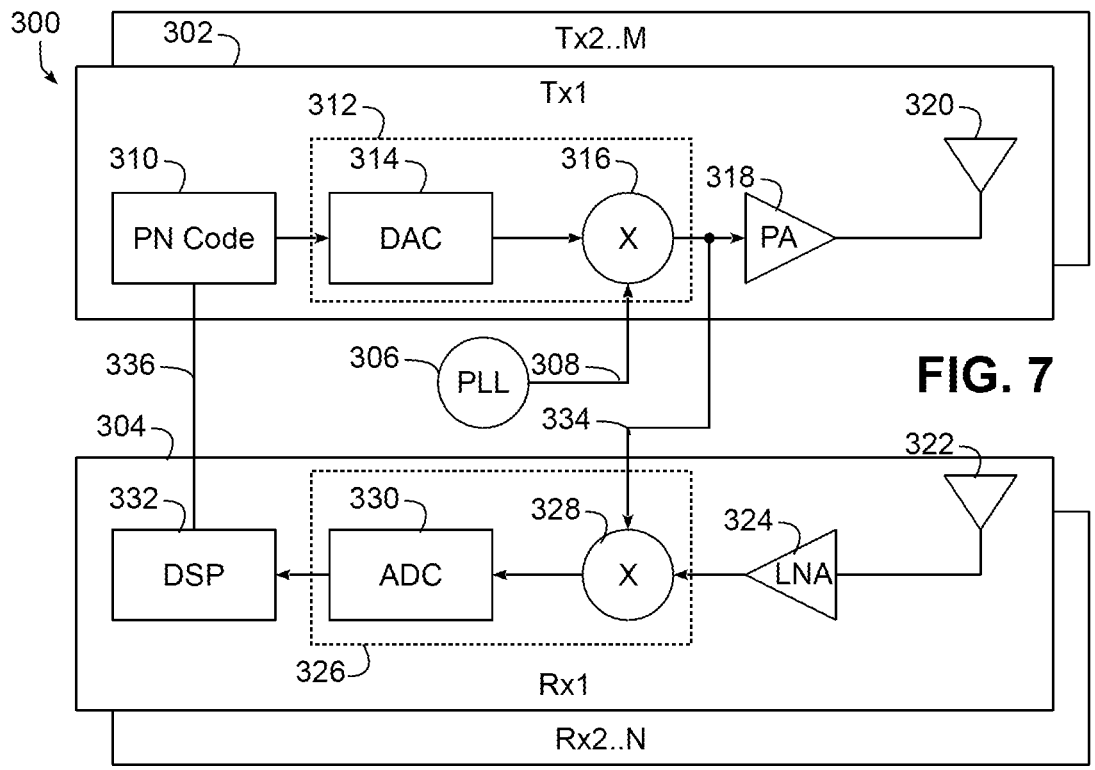
FIG. 7 illustrates an example implementation of a PMCW implementation of a MIMO radar sensor that implements time-division quadrature sampling in a manner consistent with some implementations.

FIG. 7, for example, illustrates a PMCW radar sensor 300, here implemented as a MIMO radar sensor including M transmit (Tx) channels 302 and N receive (Rx) channels 304. A local oscillator (LO) generator circuit, such as a phase locked loop (PLL) circuit 306, is used to generate a radio frequency (RF) LO signal 308, e.g., in the range of about 77 GHz in some implementations.

Each Tx channel 302 is configured to generate a PMCW radar signal including a continuous wave radio frequency (RF) signal that is selectively phase shifted using phase shift keying (e.g., binary phase shift keying (BPSK)), e.g., using pseudorandom binary sequences generated by a pseudorandom code generator 310, which may be used by each Rx channel 304 to extract the reflection of the transmitted PMCW radar signal output by each Tx channel 302 from the PMCW radar signal received by the Rx channel 304. Various encoding schemes may be used in various implementations, generally to provide sufficient autocorrelation/cross-correlation properties.

The pseudorandom codes output by generator 310 are provided to a phase modulator circuit 312 that includes a digital to analog converter (DAC) 314 that converts the binary codes to an analog intermediate frequency (IF) signal that is input to a mixer 316 to selectively phase shift LO signal 308 between first and second phase shifts, e.g., between 0 and 90 degree phase shifts in some implementations, to generate a phase modulated LO signal. The output of mixer 316 is provided to a power amplifier (PA) circuit 318, which amplifies the selectively shifted or phase modulated LO signal for transmission as a transmit or output PMCW radar signal by a Tx antenna 320.

Each Rx channel 304 is configured to receive a received or input PMCW radar signal with an Rx antenna 322, which is then amplified by a low noise amplifier (LNA) circuit 324, and the amplified signal is then processed by a quadrature sampling circuit 326. In contrast to conventional PMCW radar receiver circuits, however, rather than concurrently sampling I and Q components of the received radar signal using multiple mixers and ADCs, quadrature sampling circuit 326 includes a single mixer 328 and single ADC 330 that implement time-division quadrature sampling, and feed digital samples captured from the received PMCW radar signal to a digital signal processor (DSP) 332 for processing, with the digital samples alternating or otherwise sequencing between digital samples that are representative of I and Q components of the received PMCW radar signal (e.g., various sequences such as "I, Q, I, Q . . . ", "I, I, Q, I, Q, Q . . . " or various other arbitrary, random or programmatic sequences, including sequences where one component is sampled more frequently than the other). In the context of the present disclosure, the concept of "alternating" between the I and Q components therefore does not imply a strict I, Q, I, Q . . . sequence, but may include other sequences where sampling of an I or Q component is repeated one or more times before sampling the other component.

In the illustrated implementation of FIG. 7, time-divisional quadrature sampling is implemented by utilizing the output of the Tx channel phase modulator circuit 312 as an input to mixer 328, thereby providing a selectively shifted LO signal 334 to mixer 328 that alternates between 0 and 90 degree phase shifts based upon the pseudorandom binary sequence output by generator 310. Thus, in this implementation, generator 310 may be considered to implement at least a portion of control logic that is configured to control phase modulator circuit 312 to alternate between first and second states to vary a phase shift of selectively shifted LO signal 334, such that during each time duration when generator 310 controls phase modulator circuit 312 to operate in the first state, the digital signal output by ADC 330 is representative of the I component of the received PMCW radar signal and during each time duration when generator 310 controls phase modulator circuit 312 to operate in the second state, the digital signal output by ADC 330 is representative of the Q component of the input PMCW radar signal. In addition, in some implementations, generator 310 may output its binary sequence to DSP 332 (represented at 336) to enable DSP 332 to determine which component is currently being sampled by quadrature sampling circuit 326.

As such, in the implementation of FIG. 7, a transmitter phase modulator circuit 312 may be used to provide the selectively shifted LO signal 334 for use by quadrature sampling circuit 326. In addition, in the illustrated implementation, all Rx channels utilize the selectively shifted LO signal from the same Tx channel. In other implementations, however, generation of the selectively shifted LO signal used by a receiver quadrature sampling circuit may be independent of Tx channel phase modulation.

Figure 8:
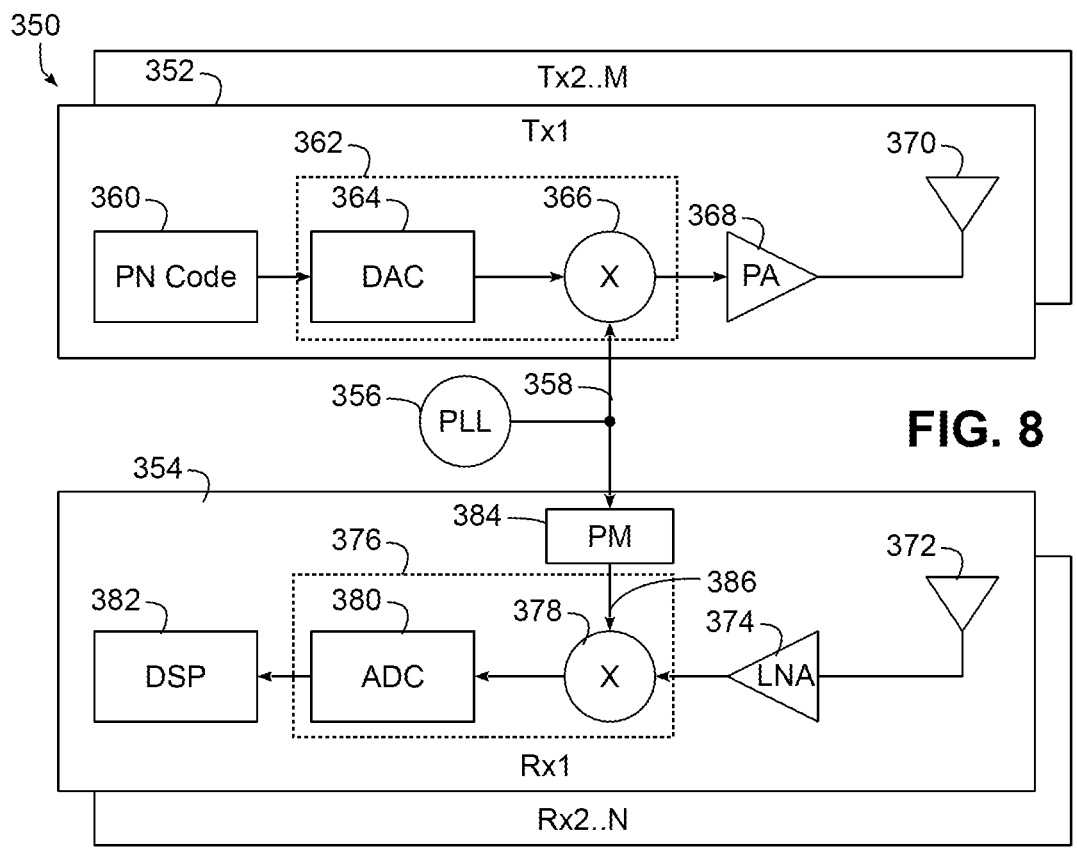
FIG. 8 illustrates another example implementation of a PMCW implementation of a MIMO radar sensor that implements time-division quadrature sampling in a manner consistent with some implementations.

FIG. 8, for example, illustrates a MIMO PMCW radar sensor 350 that is similar to radar sensor 300 of FIG. 7, and having M transmit (Tx) channels 352 and N receive (Rx) channels 354. A local oscillator (LO) generator circuit, such as a phase locked loop (PLL) circuit 356, is used to generate a radio frequency (RF) LO signal 358, and each Tx channel 352 includes a pseudorandom code generator 360 that outputs pseudorandom codes to a phase modulator circuit 362 that includes a digital to analog converter (DAC) 364 that converts the binary codes to an analog intermediate frequency (IF) signal that is input to a mixer 366 to selectively phase shift LO signal 358 between first and second phase shifts, e.g., between 0 and 90 degree phase shifts in some implementations, to generate a phase modulated LO signal. The output of mixer 366 is provided to a power amplifier (PA) circuit 368, which amplifies the selectively shifted or phase modulated LO signal for transmission as a transmit or output PMCW radar signal by a Tx antenna 370.

Each Rx channel 354 is configured to receive a received or input PMCW radar signal with an Rx antenna 372, which is then amplified by a low noise amplifier (LNA) circuit 374, and the amplified signal is then processed by a quadrature sampling circuit 376, which, similar to quadrature sampling circuit 326, includes a single mixer 378 and ADC 380 that implement time-division quadrature sampling, and feed digital samples captured from the received PMCW radar signal to a digital signal processor (DSP) 382 for processing, with the digital samples alternating between digital samples that are representative of I and Q components of the received PMCW radar signal.

However, rather than utilizing transmitter phase modulator circuit 362 to provide a selectively shifted LO signal to mixer 378, a separate phase modulator circuit 384 is used to output a selectively shifted LO signal 386 to mixer 378, such that the component being sampled by circuit 376 is independent of any pseudorandom code generator circuit used by a Tx channel of sensor 350. As illustrated in FIG. 9, for example, one implementation of phase modulator circuit 384 may include a multiplexer 388 having first and second inputs and an output that provides the selectively shifted LO signal 386 to mixer 378. The first input of multiplexer 388 may receive an unshifted LO signal from PLL 356, while the second input of multiplexer 388 may receive a 90 degree shifted LO signal generated by a 90 degree phase shift circuit 390 that generates a static 90 degree shift of the LO signal from PLL 356.

In this implementation, control logic 392, which may be implemented in phase modulator circuit 384 in some implementations, in a Rx channel circuit in some implementations, or elsewhere in radar sensor 350, may be used to control phase modulator circuit 384 to alternate between first and second states to vary a phase shift of the LO signal output by PLL 356 by controlling multiplexer 388. Thus, during each time duration when control logic 392 controls multiplexer 388 to output the first input (the unshifted LO signal), the digital signal output by ADC 380 is representative of the I component of the received PMCW radar signal and during each time duration when control logic 392 controls multiplexer 388 to output the second input (the 90 degree shifted LO signal), the digital signal output by ADC 380 is representative of the Q component of the input PMCW radar signal.

It will be appreciated, however, that other phase modulator circuit designs may be used in other implementations, so the invention is not limited to the implementation illustrated in FIG. 9.

FIG. 10 next illustrates a sequence of operations 400 for implementing time-division quadrature sampling in an Rx channel of a radar circuit consistent with some implementations, e.g., in Rx channels 304, 354 illustrated in FIGS. 7-8. During reception of a PMCW radar signal, an I component of the radar signal may be measured during a first duration (block 402), e.g., when the selectively phase shifted LO signal is not phase shifted (e.g., corresponding to a phase shift of 0 degrees), whereby the output of ADC 330, 380 of quadrature sampling circuit 326, 376 outputs digital samples representing the I component of the received PMCW radar signal. Upon detection of a phase change (block 404), e.g., based upon monitoring of the binary output of generator circuit 310 of FIG. 7 or based upon tracking in control logic 392 of FIG. 9, the output of ADC 330, 380 of quadrature sampling circuit 326, 376 represents the Q component of the received PMCW radar signal, thereby enabling for a second duration the Q component to be measured in block 406. Then, upon detection of another phase change (block 408), control returns to block 402 to begin measuring the I component, whereby measurement of the complex received PMCW radar signal effectively alternates between measuring the I and Q complex components of the signal.

It will be appreciated that in different implementations, the duration and/or frequency at which each component is sampled may vary in different embodiments. Moreover, complex components other than I and Q components may be sampled in some embodiments, e.g., based upon phase shifts other than 0 and 90 degrees. It will be appreciated, in particular, that I and Q components can be mathematically derived from different complex components sampled with different phase shifts, so the invention does not necessarily require direct sampling of I and Q components in some embodiments.

FIG. 11, for example, illustrates an alternate sequence of operations 410 to sequence of operations 400 of FIG. 8, and which is based on two phase shifts other than 0 and 90 degrees. During reception of a PMCW radar signal, an first complex component of the radar signal may be measured during a first duration (block 412), e.g., when the selectively phase shifted LO signal is phase shifted by a first phase shift of X degrees, such that a quadrature sampling circuit outputs digital samples representing the first complex component of the received PMCW radar signal. Upon detection of a phase change (block 414), the output of the quadrature sampling circuit may represent a second complex component of the radar signal thereby enabling for a second duration the second complex component to be measured in block 416. Once both complex components have been measured, I and Q components may be derived from these complex components in block 418, and then, upon detection of another phase change (block 420), control returns to block 412 to begin measuring the first complex component, whereby measurement of the complex received PMCW radar signal effectively alternates between measuring the first and second complex components of the signal.

Other variations will be apparent to those of ordinary skill. Therefore, the invention lies in the claims hereinafter appended.

What is claimed is:

1. A radar system for a vehicle, the radar system comprising:
    a modulator circuit that is configured to selectively modulate a feature of a local oscillator (LO) signal to generate a selectively modulated LO signal;
    a radar transceiver circuit that is configured to generate an output radar signal using the selectively modulated LO signal and that is configured to receive an input radar signal; and
    a sampling circuit that is coupled to the radar transceiver circuit and configured to determine a first component and a second component of the input radar signal by mixing the input radar signal with the selectively modulated LO signal;
    wherein the sampling circuit is configured to determine the first and second components of the input radar signal by alternating between sampling the first and second components of the input radar signal over time, and wherein the sampling circuit is configured to alternate between sampling the first and second components of the input radar signal over time by alternating between sampling the first and second components of the input radar signal based upon a pseudorandom binary sequence.

2. The radar system of claim 1, wherein the radar transceiver circuit includes a transmitter circuit, and the transmitter circuit is configured to generate the output radar signal using the selectively modulated LO signal.

3. The radar system of claim 2, wherein the modulator circuit is disposed in the transmitter circuit.

4. The radar system of claim 1, wherein the radar transceiver circuit includes a receiver circuit, and the receiver circuit is configured to receive the input radar signal.

5. The radar system of claim 1, wherein the first component is an in-phase (I) component of the input radar signal.

6. The radar system of claim 1, wherein the second component is a quadrature (Q) component of the input radar signal.

7. The radar system of claim 1, wherein the first and second components are complex components of the input radar signal.

8. The radar system of claim 1, wherein the radar transceiver circuit is a phase-modulated continuous wave (PMCW) radar transceiver circuit, the feature is phase, the modulator circuit is a phase modulator circuit that is configured to selectively shift a phase of the LO signal, the output radar signal is an output PMCW radar signal, and the input radar signal is an input PMCW radar signal.

9. The radar system of claim 1, wherein the sampling circuit is configured to alternate between sampling the first and second components of the input radar signal over time by repeating sampling of one of the first and second components one or more times before sampling the other of the first and second components.

10. The radar system of claim 1, wherein the sampling circuit is configured to alternate between sampling the first and second components of the input radar signal over time by sampling one of the first and second components more frequently than the other of the first and second components.

11. The radar system of claim 1, wherein the sampling circuit includes:
    a mixer configured to mix the input radar signal with the selectively modulated LO signal; and
    an analog to digital converter (ADC) configured to generate the first and second components of the input radar signal by digitally sampling an analog output signal of the mixer.

12. The radar system of claim 11, further comprising control logic configured to control the modulator circuit to vary the feature of the LO signal during at least one of first and second durations such that during the first duration the ADC outputs the first component of the input radar signal and during the second duration the ADC outputs the second component of the input radar signal.

13. The radar system of claim 12, wherein the control logic is configured to control the modulator circuit to vary the feature of the LO signal during at least one of the first and second durations by varying a phase of the LO signal during the second duration to be about 90 degrees offset from the phase of the LO signal during the first duration.

14. An autonomous vehicle control system, the autonomous vehicle control system comprising:
    a modulator circuit that is configured to selectively modulate a feature of a local oscillator (LO) signal to generate a selectively modulated LO signal;

a radar transceiver circuit that is configured to generate an output radar signal using the selectively modulated LO signal and that is configured to receive an input radar signal;

a sampling circuit that is coupled to the radar transceiver circuit and configured to determine a first component and a second component of the input radar signal by mixing the input radar signal with the selectively modulated LO signal;

control logic that is coupled to the sampling circuit and configured to generate radar data for one or more targets using the determined first and second components of the input radar signal; and one or more processors configured to operate an autonomous vehicle using the radar data generated by the control logic;

wherein the sampling circuit is configured to determine the first and second components of the input radar signal by alternating between sampling the first and second components of the input radar signal over time, and wherein the sampling circuit is configured to alternate between sampling the first and second components of the input radar signal over time by alternating between sampling the first and second components of the input radar signal based upon a pseudorandom binary sequence.

15. The autonomous vehicle control system of claim 14, wherein the radar transceiver circuit includes a transmitter circuit that is configured to generate the output radar signal using the selectively modulated LO signal and a receiver circuit that is configured to receive the input radar signal.

16. The autonomous vehicle control system of claim 14, wherein the radar transceiver circuit is a phase-modulated continuous wave (PMCW) radar transceiver circuit, the feature is phase, the modulator circuit is a phase modulator circuit that is configured to selectively shift a phase of the LO signal, the output radar signal is an output PMCW radar signal, and the input radar signal is an input PMCW radar signal.

17. The autonomous vehicle control system of claim 14, wherein the sampling circuit includes a mixer configured to mix the input radar signal with the selectively modulated LO signal and an analog to digital converter (ADC) configured to generate the first and second components of the input radar signal by digitally sampling an analog output signal of the mixer.

18. An autonomous vehicle comprising:

a drivetrain;

a radar sensor, the radar sensor including:
  a modulator circuit that is configured to selectively modulate a feature of a local oscillator (LO) signal to generate a selectively modulated LO signal;
  a radar transceiver circuit that is configured to generate an output radar signal using the selectively modulated LO signal and that is configured to receive an input radar signal; and
  a sampling circuit that is coupled to the radar transceiver circuit and configured to determine a first component and a second component of the input radar signal by mixing the input radar signal with the selectively modulated LO signal;

control logic that is coupled to the sampling circuit and configured to generate radar data for one or more targets using the determined first and second components of the input radar signal; and one or more processors configured to control the drivetrain using the radar data generated by the control logic;

wherein the sampling circuit is configured to determine the first and second components of the input radar signal by alternating between sampling the first and second components of the input radar signal over time, and wherein the sampling circuit is configured to alternate between sampling the first and second components of the input radar signal over time by alternating between sampling the first and second components of the input radar signal based upon a pseudorandom binary sequence.

* * * * *